(12) United States Patent
Walrath et al.

(10) Patent No.: US 8,312,559 B2
(45) Date of Patent: Nov. 13, 2012

(54) SYSTEM AND METHOD OF WIRELESS SECURITY AUTHENTICATION

(75) Inventors: Craig A. Walrath, Spring, TX (US); Philip H. Doragh, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1404 days.

(21) Appl. No.: 11/698,685

(22) Filed: Jan. 26, 2007

(65) Prior Publication Data

US 2008/0184355 A1    Jul. 31, 2008

(51) Int. Cl.
*G06F 21/00* (2006.01)
(52) U.S. Cl. .............................. 726/36; 726/20; 726/34
(58) Field of Classification Search .................... 726/16, 726/17, 20, 34, 36, 18, 19; 713/182, 185, 713/300, 310, 330
See application file for complete search history.

(56) References Cited

U.S. PATENT DOCUMENTS

| | | | | |
|---|---|---|---|---|
| 5,874,902 A | * | 2/1999 | Heinrich et al. | 340/10.51 |
| 6,108,785 A | * | 8/2000 | Poisner | 726/20 |
| 6,128,744 A | * | 10/2000 | Wang | 713/300 |
| 6,243,012 B1 | * | 6/2001 | Shober et al. | 340/572.7 |
| 7,024,700 B1 | * | 4/2006 | Horikoshi et al. | 726/34 |
| 2002/0171546 A1 | * | 11/2002 | Evans et al. | 340/540 |
| 2004/0268132 A1 | * | 12/2004 | Waris | 713/185 |
| 2006/0232437 A1 | * | 10/2006 | Gutowski et al. | 340/825.69 |

OTHER PUBLICATIONS

Opentopia, http://encycl.opentopia.com/term/Digital_Signal_ Transponder, pp. 1-3, publication date unknown, author unknown, place of publication unknown.

* cited by examiner

*Primary Examiner* — Edward Zee

(57) ABSTRACT

A wireless security authentication system comprises a wireless element configured to determine validity of a user credential to enable use of a computing system, the wireless element powered by inductive coupling.

27 Claims, 2 Drawing Sheets

SYSTEM AND METHOD OF WIRELESS SECURITY AUTHENTICATION

BACKGROUND OF THE INVENTION

Computer security authentication systems are used to limit login and usage of computer resources to persons possessing a valid user credential, such as a valid security token. A security token provides a similar function for a computer as car keys provide for an automobile. However, unlike an automobile, which requires keys to start an engine, current computer systems typically must already be powered on and operating in order to validate a token using an authentication system. For example, after a power-on event, some amount of time elapses before the security system is loaded, running, and can begin limiting access. Thus, such systems have a period of vulnerability if an unauthorized user is able to modify the power-on and boot-up process to disable or tamper with the authentication system before it becomes fully operative.

BRIEF DESCRIPTION OF THE DRAWINGS

For a more complete understanding of the present embodiments, the objects and advantages thereof, reference is now made to the following descriptions taken in conjunction with the accompanying drawings, in which.

DETAILED DESCRIPTION OF THE DRAWINGS

Figure 1:
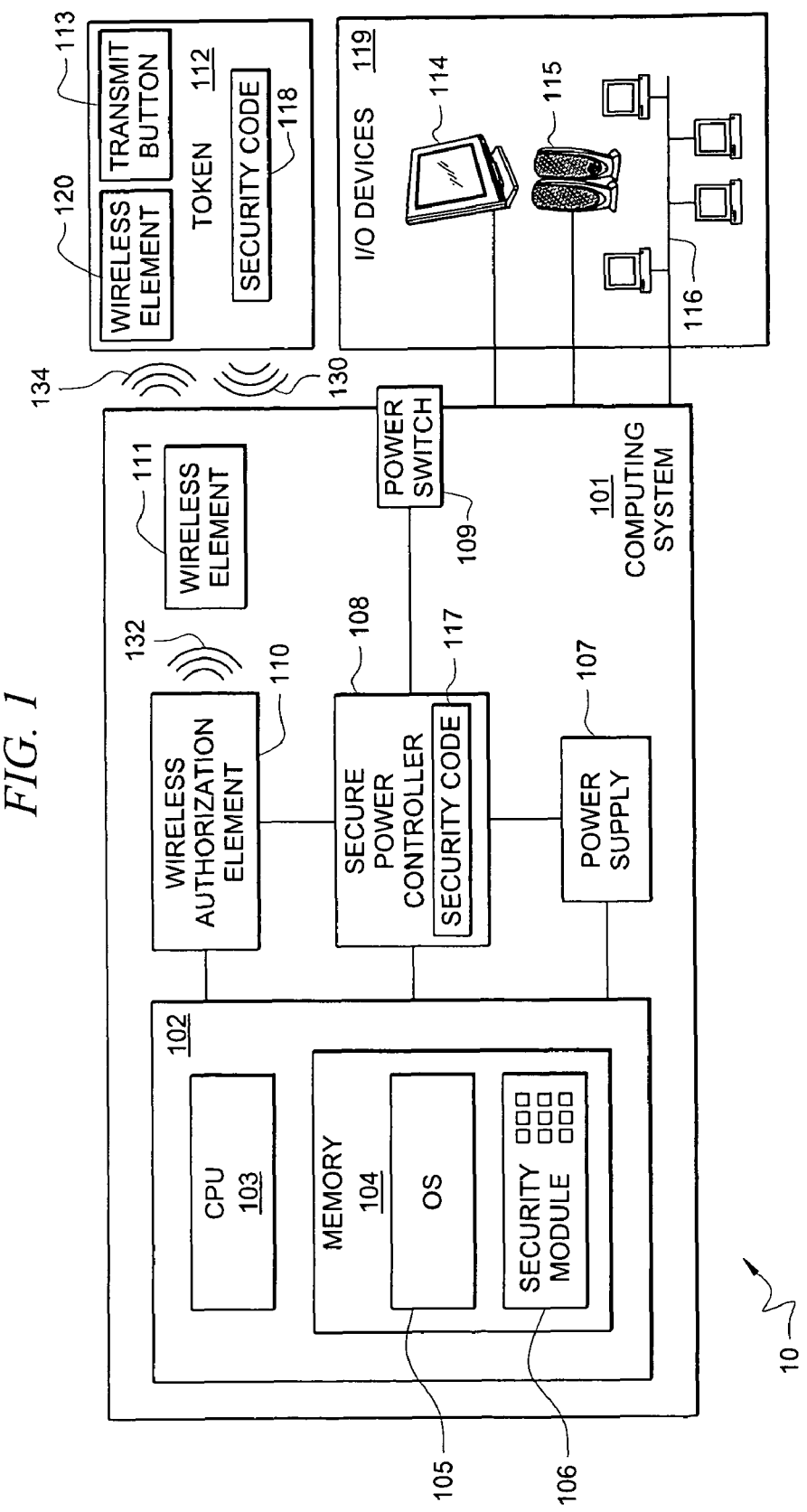
FIG. 1 is a block diagram illustrating an embodiment of a wireless security authentication system.

FIG. 1 is a block diagram illustrating an embodiment of a wireless security authentication system 10. In the embodiment illustrated in FIG. 1, system 10 is implemented and/or otherwise configured to be used with a computing system 101. Computing system 101 may comprise a desktop computer, notebook computer, portable computer, gaming device, music device, PDA, or another device using a processor. In some embodiments, system 10 enables verification of a user credential by computing system 101 without requiring computing system 101 to draw power from a power supply (e.g., a battery or external power supply) and/or before having computing system 101 powered on to a level that would enable use by a user of any function of computing system 101. User credentials are identity verification methods or devices that enable computing system 101 to verify that a particular user is authorized to use certain resources. For example, a user credential may include a username, a password, a fingerprint, or a device known as a security token containing special data that is unique to the person who should be in possession of the token. In the embodiment illustrated in FIG. 1, system 10 uses a wireless security token 112 for holding a user credential. Security token 112 may comprise a keychain fob, a wireless security access card or another personal wireless device.

In the embodiment illustrated in FIG. 1, computing system 101 comprises a circuit board 102, which holds a central processing unit (CPU) 103 and a memory 104, a power supply 107, a secure power controller 108, and a wireless authorization element 110. Power supply 107, secure power controller 108, and wireless authorization element 110 are coupled to circuit board 102. CPU 103 processes data and instructions during the operation of computing system 101, including security responses described below. It should be understood that circuit board 102 may be a single circuit board or a collection of circuit boards and that memory 104 may include volatile and non-volatile memory, as well as permanent storage. Further, portions of memory 104 may reside off circuit board 102. In FIG. 1, memory 104 comprises an operating system (OS) 105 for operating computing system 101 and also comprises a security module 106. In some embodiments, security module 106 is a combination of instructions and data that is operated upon by CPU 103 to ensure that a user is authorized to be using computing system 101 and to provide security responses if a user is unauthorized. Security module 106 may comprise software, firmware and/or hardware elements.

In the embodiment illustrated in FIG. 1, circuit board 102 is coupled to power supply 107. In some embodiments, power supply 107 provides power to components on circuit board 102 as well as other devices within and connected to computing system 101. Power supply 107 may comprise a battery or an external power connection and is controlled by secure power controller 108. In FIG. 1, computing system 101 is communicatively coupled to input/output (I/O) devices 119. In FIG. 1, I/O devices 119 comprise a display 114, which is used for displaying messages to a user, a speaker 115, which can play sounds such as an audible alarm signal, and a network connection 116, which may be used for sending alert messages to remote devices or services. Connection 116 may be wired or wireless and may be used for connecting to services and/or otherwise connecting computing system 101 to an external network. It should also be understood that other types of I/O devices 119 may be coupled to computing system 101.

In FIG. 1, secure power controller 108 is coupled to circuit board 102, power supply 107, a power switch 109, and wireless authorization element 110. Secure power controller 108 senses the operation and/or actuation of power switch 109, which indicates that a user wishes to power-on and/or boot computing system 101 to enable the user to use one or more functions provided by computing system 101. In response to receiving a power-on request via switch 109, secure power controller 108 determines whether wireless authorization element 110 indicates a valid user credential from security token 112. If the credential is valid, secure power controller 108 sends an authorization signal to power supply 107 that causes power supply 107 to supply power to circuit board 102. Computing system 101 may then begin a boot-up process (e.g., enabling power to be supplied to CPU 103, loading of OS 105, etc.). However, if the credential is not valid, secure power controller 108 does not send an authorization signal to power supply 107, and circuit board 102 is not powered on, thereby preventing the user from using computing system 101. Secure power controller 108 may also be configured to control power supply 107 for supplying or not supplying power to other components of computing system 101. Secure power controller 108 and/or wireless authorization element 110 may comprise software, firmware and/or hardware elements.

In the embodiment illustrated in FIG. 1, secure power controller 108 is also coupled to circuit board 102 and is configured to work in conjunction with security module 106 and OS 105 when computing system 101 is powered on. For example, in some embodiments, after secure power controller 108 has enabled computing system 101 to power-on for use by a user, security module 106 is configured to cause secure power controller 108 to control power supply 107 so that power supply 107 shuts off power to all or selected components of computing system 101 in response to detecting a security event, such as a sudden absence of a valid user credential (e.g., in response to a user walking away from computing system 101 to a location where security token 112 is out of wireless communication range with computing system 101). In some embodiments, after secure power controller 108 has enabled computing system 101 to power-on for use, in response to detecting a security event, security module 106 is configured to cause OS 105 to log out a user or otherwise freeze/suspend a user session, sound an audible alarm over speaker 115, initiate a visual alarm on display 114, and/or send an alert to a remote device through network connection 116.

In some embodiments, secure power controller 108 is configured to relay information regarding a user credential to CPU 103 so that the user credential is used in granting a specific level of access on computing system 101. For example, computing system 101 may have a series of predefined access profiles stored in memory 104 and controlled by OS 105, such as temporary guest, permanent guest, regular user, super user, repair technician and administrator. Guest level access may be configured to allow a user to operate some programs but restrict certain operations, such as installing or deleting programs and data from memory 104. Administrator access may be configured to enable more control of the content and configuration of computing system 101. It should be understood that various access levels and/or configurations may be used.

In some embodiments, controller 108 comprises a security code 117. Security code 117 may be used to authenticate that power supply 107 is powering circuit board 102 as a result of an authenticated user credential. For example, security code 117 may comprise a decryption key used to decrypt a portion of memory 104, such as a portion of OS 105 or security module 106. A requirement that controller 108 send security code 117 to either power supply 107 and/or circuit board 102 prevents an unauthorized user from attempting to boot-up computing system 101 by bypassing secure power controller 108. For example, if an unauthorized user attempts to cause power supply 107 to supply power to circuit board 102, or else attempts to power circuit board 102 with a different power supply, then controller 108 will not send security code 117 to either power supply 107 or circuit board 102. Either security module 106 will detect the absence of code 117 and respond with a security measure, or else computing system 101 will not boot-up to full operability, denying the unauthorized user the benefit of access to computing system 101. For example, in some embodiments, computing system 101 may be configured to halt the boot-up process at a basic input/output system (BIOS) password entry screen, which requires the entry of the proper password before the boot-up process continues.

System 10 verifies a user credential prior to computing system 101 powering-on the CPU and/or booting-up, which reduces the likelihood that an unauthorized person may intercept and defeat an authentication system during the boot-up process. For example, an unauthorized user may attempt to interrupt the boot-up process and alter or substitute data in memory 104 prior to CPU 103 executing instructions in security module 106 that would prevent the user from operating computing system 101. Embodiments of system 10 prevent or substantially prevent an unauthorized user from interrupting the boot-up process by preventing power from being supplied to circuit board 102 and/or other components of computing system 101 unless a valid user credential has been received.

Secure power controller 108 determines whether wireless authorization element 110 indicates a valid user credential from security token 112. In the embodiment illustrated in FIG. 1, security token 112 is a wireless device which is able to communicate with a wireless element 111 disposed in computing system 101. Wireless element 111 may comprise a radio frequency identification (RFID) tag or a "Memory Spot" chip, produced by Hewlett-Packard Development Company (HP), or another type of inductively powered wireless processing device.

In some embodiments, wireless element 111 comprises a complementary metal oxide semiconductor (CMOS) integrated circuit (IC), which does not require either a battery or external power. In this embodiment, wireless element 111 is powered by radio frequency energy transmitted from either token 112 (indicated by 130 in FIG. 1) or wireless authorization element 110 (indicated by 132 in FIG. 1) through a process known as inductive coupling. In response to token 112 transmitting radio frequency energy 130, the radio frequency energy 130 powers at least one processor in wireless element 111, thereby enabling wireless element 111 to process any data sent to it during the transmission. For example, if token transmits a security code 118, wireless element 111 uses the transmission energy 130 and content in order to process security code 118 and make a determination as to whether it represents a valid input (e.g., an authorized credential). Wireless element 111 may compare code 118 to data stored in a memory element of wireless element 111, attempt to decrypt security code 118, use security code 118 as a decryption key for other data, or perform any other function that indicates the validity of code 118. A match with stored data and/or a valid decryption result indicates that code 118 is valid. Thus, in some embodiments, a user credential is processed so that a validity determination may be made by wireless element 111 without using any power external to wireless element 111 (e.g., without using power from power supply 107).

As shown in FIG. 1, wireless element 111 is located in computing system 101 and communicates with both wireless security token 112 and wireless authorization element 110. In the embodiment illustrated in FIG. 1, token 112 comprises a transmit button 113 which is actuatable to cause token 112 to broadcast a user credential, such as a security code 118 (e.g., via radio frequency energy), and to facilitate energizing of wireless element 111. In some embodiments of operation, a user in possession of security token 112 and within broadcast range of computing system 101 would actuate both power switch 109 and transmit button 113. Actuation of power switch 109 causes power controller 108 to control power supply 107 so that power supply 107 powers wireless authorization element 110 without also powering circuit board 102. Wireless authorization element 110 is then able to communicate with wireless element 111 using inductive coupling and determine whether wireless element 111 has received a valid user credential. If a valid user credential has been received, wireless authorization element 110 communicates with and/or otherwise causes secure power controller 108 to provide power to circuit board 102 to enable computing system 101 to be powered on and/or otherwise booted to a level enabling use thereof. It should be understood, though, that if wireless element 111 is inside computing system 101 and wireless element 111 had a port for a wired connection, wireless element 110 could use the wired connection to communicate with wireless element 111. Further, it should be understood that other wireless devices may perform the function of communicating with security token 112.

It should also be understood that token 112 may be configured without transmit button 113 such that token 112 automatically transmits radio frequency energy 130 independently of any user action (e.g., periodic pulses of radio frequency energy automatically transmitted by token 112 via an on-board power supply of token 112). In some embodiments, token 112 may be configured such that button 113 merely turns token 112 on such that, after actuation of button 113, token 112 continuously and periodically transmits radio frequency energy 130 independently of any further user action until button 113 is used to turn token 112 off.

Secure power controller 108 may be configured to require one or the other of switch 109 and button 113 to be pressed first, or require both to be pressed simultaneously, or to require that switch 109 and button 113 each be pressed within a predetermined time limit of each other, but in any order. Secure power controller 108 correlates a request from switch 109 with a valid user credential from token 112 so that computing system 101 may be powered on to a level to facilitate use thereof by a user. After power switch 109 has been actuated, wireless authorization element 110 transmits a query to wireless element 111 in order to ascertain whether wireless element 111 has validated a user credential within a predetermined time limit (e.g., as specified and/or otherwise indicated by secure power module 108). For example, in this embodiment, the predetermined time limit is used to verify validity of a user credential within a predetermined time period based on a user actuating button 113 to transmit a user credential. However, it should be understood that in some embodiments, a particular time period for validation is unnecessary (e.g., if token 112 is configured to automatically and/or periodically transmit radio frequency energy 130, wireless element 111 would remain energized while token 112 is in communication range thereof such that wireless element 111 may continually and/or periodically verify the user credential). Secure power controller 108 causes wireless element 110 to transmit the query in response to a user actuating power switch 109. If wireless element 111 has received and/or processed a user credential, wireless authorization element 110 retrieves the credential and/or a validity confirmation from wireless element 111 and communicates this information to secure power controller 108. Further, wireless authorization element 110 may communicate security code 118 to circuit board 102 once circuit board 102 has been powered-up. Code 118 may be used in a similar manner as security code 117.

One advantage of powering wireless element 111 from radio frequency energy is that no battery power or other type of on-board power source is required for wireless element 111 to monitor and/or validate a user credential. If computing system 101 was a notebook computer and power supply 107 was a battery, for example, no battery power needs to be used to keep wireless element 111 in a constant state of monitoring for a transmission. For example, wireless element 111 is able to operate independently of power from power supply 107, thereby prolonging battery life.

In some embodiments, security token 112 comprise a wireless element 120 that holds a copy of security code 118 and is powered inductively (e.g., by an RFID tag or otherwise). Thus, in some embodiments, computing system 101 is configured to ensure that security token 112 remains within communication range (and therefore within proximity) of computing system 101 without requiring further battery usage from security token 112. In some embodiments, after computing system 101 is powered on for use thereof, wireless authorization element 110 periodically transmits a query for a user credential (e.g., by transmitting radio frequency energy 132). In this embodiment, the transmission power from wireless authorization element 110 reaches outside computing system 101 and inductively powers wireless element 120 (i.e., provided security token 112 is within communication range of wireless authorization element 110). If wireless element 120 is within wireless communication range of wireless authorization element 110, wireless element 120 responds to queries from wireless authorization element 110 with security code 118. Wireless authorization element 110 communicates the periodic query results to security module 106. If security module 106 senses an elapsed period of time without a communication of a valid user credential from wireless authorization element 110, security module 106 is configured to interpret the lack of a user credential as an indication that security token 112 has moved out of communication range of wireless authorization element 110. Security module 106 will then respond with a security measure, such as freezing a user session, which would require entry of a password to unfreeze the session, logging out the user, powering off computing system 101 in part or in whole, sounding an audible alarm, initiating a visual alarm, and/or sending an alert to a remote device.

In some embodiments, wireless element 120 is configured to validate a user credential. For example, in some embodiments, in response to actuation of switch 109, wireless authorization element 110 transmits radio frequency energy 132 that energizes wireless element 120. The transmission power from wireless authorization element 110 is also used to transmit a credential to wireless element 120 that wireless element 120 verifies (e.g., by comparing the credential to security code 118). If there is a match between the credential received from wireless authorization element 110, wireless element 120 is configured to communicate the validity indication to wireless authorization element 110. In other embodiments, in response to actuation of token 112, token 112 transmits radio frequency energy 130 that energizes wireless element 111. In response to being energized, wireless element 111, independently or in cooperation with wireless authorization element 110, transmits a credential to wireless element 120 that wireless element 120 verifies (e.g., by comparing the credential to security code 118). If there is a match, wireless element 120 is configured to communicate the validity indication to wireless authorization element 110. Thus, it should be understood that the validity determination for a user credential may be performed by computing system 101 and/or security token 112.

It should be understood that in some embodiments, wireless authorization element 110 communicates with and/or otherwise interfaces with wireless element 111 to verify that token 112 remains in communication range of computing system 101. For example, in some embodiments, security token 112 is configured to continuously and/or periodically communicate radio frequency energy 130, thereby enabling wireless element 111 to remain energized and continuously and/or periodically validate the user credential from token 112. Thus, in this embodiment, if wireless element 111 becomes de-energized, (e.g., as a result of token 112 ceasing transmitting radio frequency energy 130 and/or otherwise being moved outside of communication range of computing system 101), wireless authorization element 110 is configured to treat the indication as a lack of validated user credential and may initiate a security measure. It should be understood that in some embodiments, computing system 101 is configured to continuously and/or periodically communicate with token 112 to verify that token 112 remains in communication range of computing system 101. For example, in some embodiments, radio frequency energy transmitted by wireless element 111 (indicated by 134 in FIG. 1) may be used to energize wireless element 120 such that, in response to being energized, wireless element 120 transmits a user credential to wireless element 111 for validation. In other embodiments, wireless authorization element 110 may be configured to communicate wirelessly with token 112 (e.g., without inductive coupling) to validate a security credential and/or otherwise verify that token 112 remains in communication range of computing system 101. It should be understood that in some embodiments, system 10 may be configured such that only radio frequency energy transmitted by token 112 is used (e.g., radio frequency energy 130), only radio frequency energy transmitted by wireless authorization element 110 is used (e.g., radio frequency energy 132), only radio frequency energy transmitted by wireless element 111 is used (e.g., radio frequency energy 134), or any combination of the foregoing, to establish inductive coupling between elements 110, 111 and/or 120.

In some embodiments, actuation of switch 109 may be used to initiate validation of a user credential. For example, in some embodiments, in response to actuation of switch 109, secure power controller 108 interfaces with wireless authorization element 110 to cause wireless authorization element 110 to transmit radio frequency energy to energize wireless element 120. In response to energizing of wireless element 120, wireless element 120 is configured to transmit a security credential to be validated by wireless authorization element 110 or wireless element 111. Thus, it should be understood that system 10 may be configured using a variety of different implementations.

Using a wireless security token therefore provides proximity security. For example, in some embodiments, computing system 101 is configured to detect when an authorized user moves token 112 out of wireless communication range of computing system 101 (e.g., because no signal will be detectable between token 112 and computing system 101). This could occur, for example, if token 112 is carried by a user (e.g., such as in a pocket) and the user walks away. A presence of a valid signal may therefore be interpreted as an indication that wireless security token 112 is proximate computing system 101 while an absence of a signal following a presence of the signal may be interpreted as a user leaving computing system 101 unattended or that computing system 101 has been taken out of communication range of a user (e.g., as a result of being stolen). In this situation, either security module 106 or secure power controller 108 may initiate a security response to prevent use of computing system 101. The security response could include freezing a user session, logging out a user, powering-off computing system 101 in part or in whole, sounding an audible alarm using speaker 115, initiating a visual alarm on display 114, and/or sending an alert to a remote device or system using connection 116. The alert to a remote device or system could be an email sent to a network manager or the authorized user's personal digital assistant (PDA). It should also be understood that computing system 101 may be configured such that in response to token 112 returning to within communication range of computing system 101, various functions of computing system 101 are automatically restored.

Figure 2:
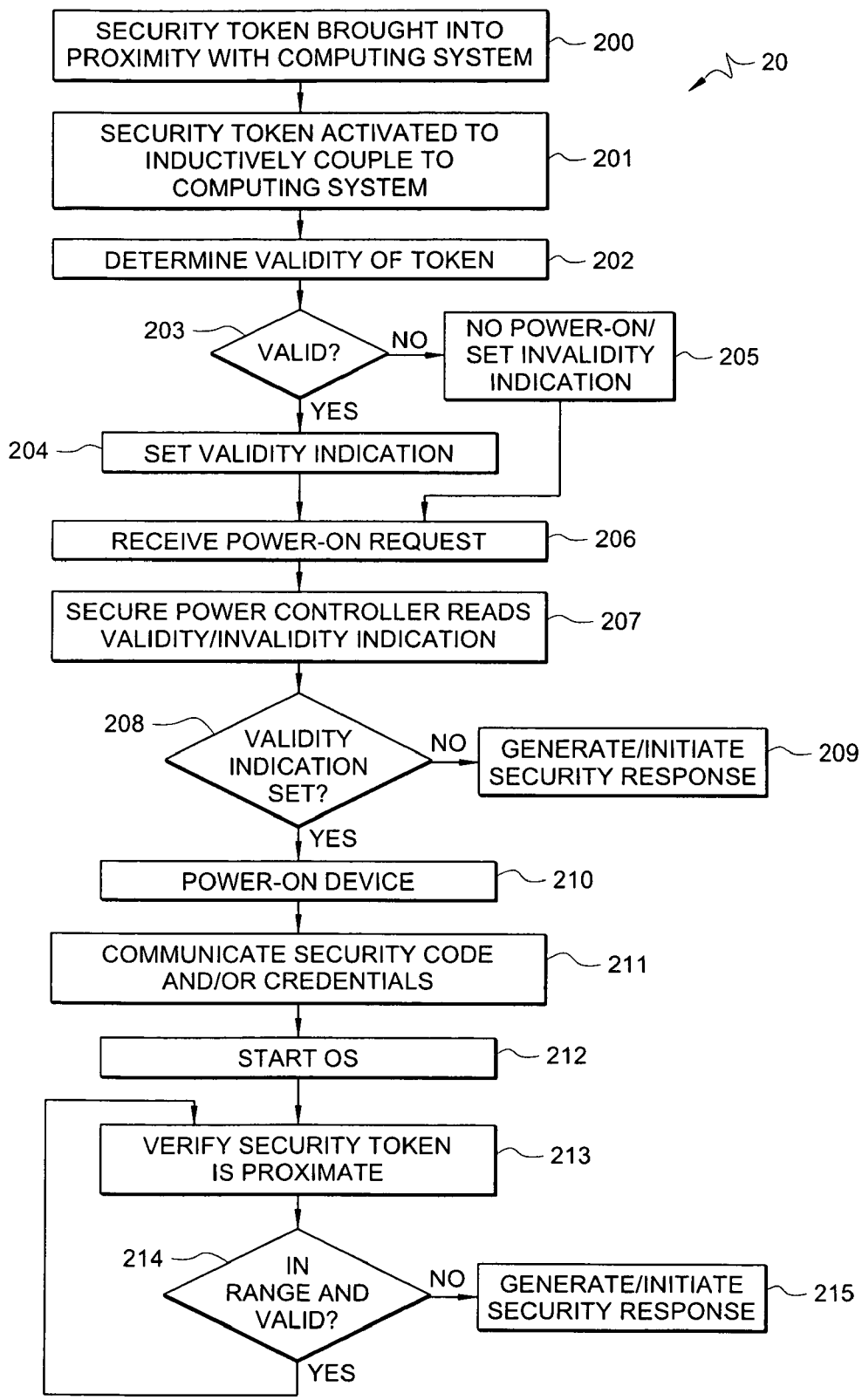
FIG. 2 is a flow diagram illustrating an embodiment of a wireless security authentication method.

FIG. 2 is a flow diagram illustrating an embodiment of a method 20 for wireless security authorization. FIG. 2 is described using the embodiment of system 10 shown in FIG. 1, although it should be understood that other embodiments may be used with method 20. At block 20, security token 112 is brought into proximity with wireless element 111 so that token 112 and wireless element 111 are within wireless communication range of each other. Security token 112 is activated using button 113 at block 201, thereby inductively coupling token 112 to computing system 101 (e.g., inductively coupling token 112 to wireless element 111 by energizing wireless element 111 using radio frequency energy 130) and transmitting code 118. Wireless element 111 receives code 118 and determines the validity of a user credential by processing security code 118 at block 202. At decision block 203, if the credential is determined to be valid, the method proceeds to block 204 where wireless element 111 sets a validity indication (e.g., by setting a time-coded flag within its memory or generating a specific code). If however, the user credential is not valid, the method proceeds to block 205 where wireless element 111 either does nothing (e.g., does not enable power supply 107 to supply power to circuit board 102) or sets an invalidity indication in block 205.

In response to receiving a power-on request based on actuation of power switch 109 in block 206, secure power controller 108 reads the validity indication in wireless element 111 using wireless element 110 at block 207. Secure power controller 108 determines whether a valid indicator is set at decision block 208 and, if not, initiates a security response at block 209. If the validity indicator is set to a valid state, secure power controller 108 initiates a power-on for computing system 101 and/or otherwise enables power to be supplied to one or more elements of computing system 101 to enable use of computing system 101 at block 210. At block 211, a security code and/or credential is sent to circuit board 102 (e.g., for use in determining access privileges or for the operation of various functions of computing system 101). The determination of access privileges and/or for the operation of various functions of computing system 101 may be performed by software, firmware, hardware, or a combination thereof. The security code could be code 117 sent by secure power controller 108 or code 118 sent from token 112 through wireless element 110.

OS 105 starts booting at block 212. After OS 105 is operating, security module 106 and/or secure power controller 108 repeatedly verifies that token 112 is proximate (i.e., that token 112 is within wireless communication range) and that a user credential remains valid at block 213. For example, in some embodiments, upon a negative indication at decision block 214, security module 106 and/or secure power controller 108 initiates a security response at block 215 to react to token 112 moving outside communication range. In response to a positive indication that token 112 is proximate computing system 101 at decision block 214, the method proceeds to block 213 where continued monitoring for the presence of token 112 is performed.

It should be understood that in the described method, certain functions may be omitted, accomplished in a sequence different from that depicted in FIG. 2, or simultaneously performed. Also, it should be understood that the method depicted in FIG. 2 may be altered to encompass any of the other features or aspects as described elsewhere in the specification. Further, embodiments may be implemented in software and can be adapted to run on different platforms and operating systems. In particular, functions implemented by secure power controller 108, security module 106, wireless element 111, wireless authorization element 110 and/or wireless element 120, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

What is claimed is:

1. A wireless security authentication method executed by a computing system, comprising:
   receiving, at the computing system, a user credential from a wireless security token that is external to the computing system;
   determining, by the computing system, validity of the user credential to enable use of the computing system, the user credential validated using an element powered by inductive coupling with the wireless security token, wherein the element is in the computing system, wherein the user credential is validated by the computing system before the computing system powers on and before a central processing unit (CPU) of the computing system is powered; and
   powering on the CPU and loading an operating system in response to validating the user credential.

2. The method of claim 1 further comprising, in response to determining that the user credential is valid, allowing the computing system to begin a boot-up process.

3. The method of claim 2 further comprising, in response to determining that the user credential is not valid, preventing the computing system from beginning the boot-up process.

4. The method of claim 1 further comprising, in response to determining that the user credential is valid, verifying that the user credential remains valid.

5. The method of claim 1, wherein the user credential includes data that is unique to a person who carries the wireless security token.

6. The method of claim 1 further comprising, shutting off power to the computing system in response to the wireless security token being moved outside of a communication range of the computing system.

7. The method of claim 1, wherein the user credential is stored on the wireless security token that includes a transmit button that is actuable to cause the wireless security token to transmit the user credential to the computing system.

8. The method of claim 1 further comprising:
   allowing the computing system to remain in a power-on state while the wireless security token containing the user credential is within wireless communication range of the computing system;
   freezing a user session of the computing system when the wireless security token is out of a wireless communication range of the computing system.

9. The method of claim 1 further comprising, shutting down the computing system in response to the wireless security token containing the user credential moving out of a wireless communication range of the computing system.

10. The method of claim 1 further comprising, automatically logging out a user from a user session with the computing system in response to the wireless security token storing the user credential moving out of a wireless communication range of the computing system.

11. The method of claim 1 further comprising, in response to determining that the user credential is valid, determining an access level of use of the computing system using the user credential.

12. A computer, comprising:
   a wireless element to receive a user credential from a portable security token before the computer powers on and to determine validity of the user credential before enabling the computer to power on, wherein the wireless element is powered by inductive coupling;
   a central processing unit (CPU), wherein the wireless element is to determine validity of the user credential prior to the CPU being powered on; and
   a controller to cause power to be supplied to the CPU in response to determining that the user credential is valid.

13. The computer of claim 12, wherein the controller is to power off the computer in response to the portable security token moving out of a wireless range of the wireless element.

14. The computer of claim 12, wherein the controller to power on the computer and begin a boot-up process to load an operating system in response to determining that the user credential is valid.

15. The computer of claim 12, wherein the wireless element is configured to verify that the portable security token remains within wireless communication range of the computer.

16. The computer of claim 12 wherein the controller is configured to prevent power from being supplied to the CPU in response to determining that the user credential is not valid.

17. The computer of claim 12 further comprising a security module configured to, in response to determining that the user credential is valid, trigger a security response if the user credential becomes invalid.

18. The computer of claim 17, wherein the security response comprises at least one of freezing a user session, logging out a user, powering-off the computer, sounding an audible alarm, initiating a visual alarm, and sending an alert to a remote device.

19. The computer of claim 12, wherein the wireless element is configured to, in response to determining that the user credential is valid, verify that the user credential remains valid.

20. A computer comprising:
   a power controller;
   a power supply coupled to the power controller;
   a wireless authorization element coupled to the power controller, the wireless authorization element to receive a user credential and determine validity of the user credential before powering on and commencing a boot-up process of the computer, wherein the wireless authorization element is powered by inductive coupling;
   a central processing unit (CPU), wherein the wireless authorization element is to determine validity of the user credential prior to the CPU being powered on; and
   wherein the power controller is to cause power to be supplied to the CPU in response to determining that the user credential is valid.

21. The computer of claim 20, wherein the wireless authorization element is to prevent the power supply from providing power to power on the computer when the user credential is not validated.

22. The computer of claim 20, wherein the wireless authorization element is to freeze a user session on the computer when a portable security token that includes the user credential moves out of a wireless communication range of the computer.

23. The computer of claim 20, wherein the wireless authorization element is to prevent the computer from performing a boot-up process when the user credential is not validated.

24. The computer of claim 20, wherein the wireless authorization element is to automatically power off the computer when a portable security token that includes the user credential moves out of a wireless communication range of the computer, and wherein the wireless authorization element is powered by inductive coupling with the portable security token.

25. A wireless security authentication system, comprising:
a computing device having a processing element configured to, without drawing power from a power supply of the computing device, determine validity of a user credential to enable use of the computing device by a user, wherein the computing device is to determine the validity of the user credential before the computing device powers on, the processing element being powered by inductive coupling, and
wherein the computing device further comprises:
   a central processing unit (CPU), wherein the processing element is to determine validity of the user credential prior to the CPU being powered on; and
   a controller to cause power to be supplied to the CPU in response to determining that the user credential is valid.

26. The wireless security authentication system of claim 25, wherein the user credential uniquely identifies a user.

27. A wireless security authentication system, comprising:
a computing device having a secure power controller configured to prevent power from being supplied to a central processing unit (CPU) of the computing device until a wireless element in the computing device verifies validity of a user credential to enable use of the computing device by a user, wherein the wireless element is to verify the validity of the user credential before the computing device powers on and begins a boot-up process, and the wireless element is powered by inductive coupling.

* * * * *

UNITED STATES PATENT AND TRADEMARK OFFICE
CERTIFICATE OF CORRECTION

PATENT NO. : 8,312,559 B2
APPLICATION NO. : 11/698685
DATED : November 13, 2012
INVENTOR(S) : Craig A. Walrath et al.

It is certified that error appears in the above-identified patent and that said Letters Patent is hereby corrected as shown below:

In column 9, line 39, in Claim 7, delete "actuable" and insert -- actuatable --, therefor.

Signed and Sealed this
Ninth Day of April, 2013

Teresa Stanek Rea
*Acting Director of the United States Patent and Trademark Office*